United States Patent
Cammenga et al.

(10) Patent No.: US 10,795,187 B2
(45) Date of Patent: Oct. 6, 2020

(54) PASS-THROUGH SEAL FOR AN ELECTRO-OPTIC ASSEMBLY

(71) Applicant: GENTEX CORPORATION, Zeeland, MI (US)

(72) Inventors: David J. Cammenga, Zeeland, MI (US); Adam R. Heintzelman, Grand Rapids, MI (US); Juan C. Lara, Holland, MI (US); Xiaoxu Niu, Grand Rapids, MI (US)

(73) Assignee: GENTEX CORPORATION, Zeeland, MI (US)

(*) Notice: Subject to any disclaimer, the term of this patent is extended or adjusted under 35 U.S.C. 154(b) by 155 days.

(21) Appl. No.: 16/003,241

(22) Filed: Jun. 8, 2018

(65) Prior Publication Data

US 2018/0356653 A1 Dec. 13, 2018

Related U.S. Application Data

(60) Provisional application No. 62/518,935, filed on Jun. 13, 2017.

(51) Int. Cl.
| | | |
|---|---|---|
| *G02F 1/01* | (2006.01) | |
| *B60R 1/08* | (2006.01) | |
| *G02F 1/1341* | (2006.01) | |
| *G02F 1/1339* | (2006.01) | |

(52) U.S. Cl.
CPC ............ *G02F 1/0107* (2013.01); *B60R 1/088* (2013.01); *G02F 1/1339* (2013.01); *G02F 1/1341* (2013.01)

(58) Field of Classification Search
CPC .... G02F 1/0107; G02F 1/1339; G02F 1/1341; B60R 1/088; B32B 17/10917; B29K 2063/00; B29K 2105/20; B29K 2995/0005; B29K 2995/003; B29D 11/00596
See application file for complete search history.

(56) References Cited

U.S. PATENT DOCUMENTS

| | | |
|---|---|---|
| 2009/0290369 A1 | 11/2009 | Schofield et al. |
| 2015/0140146 A1 | 5/2015 | Habibi |
| 2015/0239399 A1 | 8/2015 | Tonar et al. |
| 2016/0193963 A1 | 7/2016 | Anderson et al. |
| 2017/0120827 A1 | 5/2017 | McCabe et al. |

OTHER PUBLICATIONS

International Preliminary Report on Patentability dated Dec. 17, 2019, for corresponding PCT application No. PCT/US2018/036586, 7 pages.
International Search Report dated Sep. 27, 2018, for corresponding PCT application No. PCT/US2018/036586, 9 pages.

*Primary Examiner* — Yan Lan
(74) *Attorney, Agent, or Firm* — Price Heneveld LLP; Bradley D. Johnson

(57) ABSTRACT

An electro-optic assembly includes a first substrate and a second substrate. A primary seal is disposed between the first substrate and the second substrate. The primary seal, the first substrate, and the second substrate define an interior cavity. A fill port extends through the primary seal. A secondary seal is disposed proximate a side of the primary seal. The primary seal and the secondary seal define a channel. A sealing plug is disposed within the channel.

16 Claims, 8 Drawing Sheets

PASS-THROUGH SEAL FOR AN ELECTRO-OPTIC ASSEMBLY

TECHNOLOGICAL FIELD

The present invention generally relates to an electro-optic assembly, and more particularly to a pass-through seal for a small electro-optic assembly.

BACKGROUND

Traditional methods of sealing an electro-optic assembly may lead to pressurized and sometimes bowed substrates, which puts unnecessary stresses on the electro-optic assembly as a whole. Forcing a plugging material into a single port of a cavity that holds a non-compressible electro-optic medium can result in poor plugging and leaks in the electro-optic assembly.

SUMMARY OF THE DISCLOSURE

According to some aspects of the present disclosure, an electro-optic assembly may comprise a first substrate; a second substrate opposite the first substrate; a seal disposed between the first substrate and the second substrate, wherein the seal, the first substrate, and the second substrate define an interior cavity; a first opening, having a first cross-section, defined by the first substrate; a second opening, having a second cross-section, defined by the second substrate, wherein the first opening and the second opening are in fluid communication with the interior cavity. The electro-optic assembly may further comprise a plug disposed within and extending between the first and second openings. The plug may comprise a sealing plug material; the sealing plug material may comprise an initially fluid material. The sealing plug material may be capable of hardening to form a solid plug. The electro-optic assembly may further comprise a sealing material; the sealing material may be disposed to cover exposed portions of the plug. The plug may comprise a pass-through plug; and the plug may extend through first and second openings and a portion of the interior cavity. The plug may comprise a first and a second end, and a shank extending therebetween; and the first end may comprise a head, the head configured to have a larger cross-section than at least one of the first and second cross-sections of the first and the second openings. The plug may comprise a rivet. The electro-optic assembly may further comprise a sealing material; the sealing material may be disposed to cover exposed portions of the head and the second end of the plug. The sealing material may be initially deformable. The second end of the plug may be deformable.

According to some aspects of the present disclosure, an electro-optic assembly may comprise a first substrate; a second substrate opposite the first substrate; a primary seal disposed between the first substrate and the second substrate, the primary seal, the first substrate, and the second substrate define an interior cavity; a fill port extending through the primary seal; a secondary seal disposed proximate a side of the primary seal, the primary seal and the secondary seal define a channel adjacent the fill port; and a plug disposed within the channel. The plug may be an initially fluid material.

According to some aspects of the present disclosure, a method of making an electro-optic assembly includes forming a first substrate and a second substrate. A primary seal may be provided between the first substrate to the second substrate to define an interior cavity. A fill port may be formed through the primary seal. A secondary seal may be positioned proximate the primary seal to form a channel adjacent the fill port. The channel includes an inlet and an outlet. A fluid plug may be flowed through the channel. The fluid may be adapted to solidify and seal the interior cavity.

According to some aspects of the present disclosure, an electro-optic assembly includes a first substrate and a second substrate. A primary seal may be disposed between the first substrate and the second substrate. The primary seal, the first substrate, and the second substrate define an interior cavity. A fill port extends through the primary seal. A secondary seal may be disposed proximate a side of the primary seal. The primary seal and the secondary seal define a channel adjacent the fill port. A sealing plug may be disposed within the channel.

According to some aspects of the present disclosure, a method of making an electro-optic assembly includes forming a first substrate and a second substrate. A primary seal may be provided between the first substrate and the second substrate. The first substrate, the second substrate, and the primary seal define an interior cavity. A first fill port may be formed through the primary seal between the first substrate and the second substrate. A second fill port may be formed through one of the first and the second substrates. The first fill port and the second fill port are in fluid communication with the interior cavity and together define a channel. A fluid plug may be flowed through the channel.

According to some aspects of the present disclosure, an electro-optic assembly includes a first substrate and a second substrate. A primary seal may be disposed between the first substrate and the second substrate. The primary seal, the first substrate, and the second substrate define an interior cavity. A first fill port extends through the primary seal between the first substrate and the second substrate. A second fill port extends through one of the first and the second substrates. The first fill port and the second fill port are in fluid communication with the interior cavity and together define a channel. A sealing plug may be disposed within the channel. One end of first and second openings may be disposed to open at least partially into primary seal. One end of first and second openings may be disposed completely in primary seal. First and second openings may be opposite one another.

According to some aspects of the present disclosure, a method of making an electro-optic assembly includes forming a first substrate and a second substrate. A primary seal may be provided between the first substrate to the second substrate. The first substrate, the second substrate, and the primary seal define an interior cavity. A first fill port may be formed through the first substrate. A second fill port may be formed through the second substrate. The first fill port and the second fill port are in fluid communication with the interior cavity and together define a channel. A fluid plug may be flowed through the channel.

According to some aspects of the present disclosure, an electro-optic assembly includes a first substrate and a second substrate. A primary seal may be disposed between the first substrate and the second substrate. The primary seal, the first substrate, and the second substrate define an interior cavity. The first substrate defines a first opening. The second substrate defines a second opening. The first opening and the second opening are in fluid communication with the interior cavity and together define a channel. A sealing plug may be disposed within the channel.

These and other features, advantages, and objects of the present invention will be further understood and appreciated by those skilled in the art by reference to the following specification, claims, and appended drawings.

DETAILED DESCRIPTION

Figure 1:
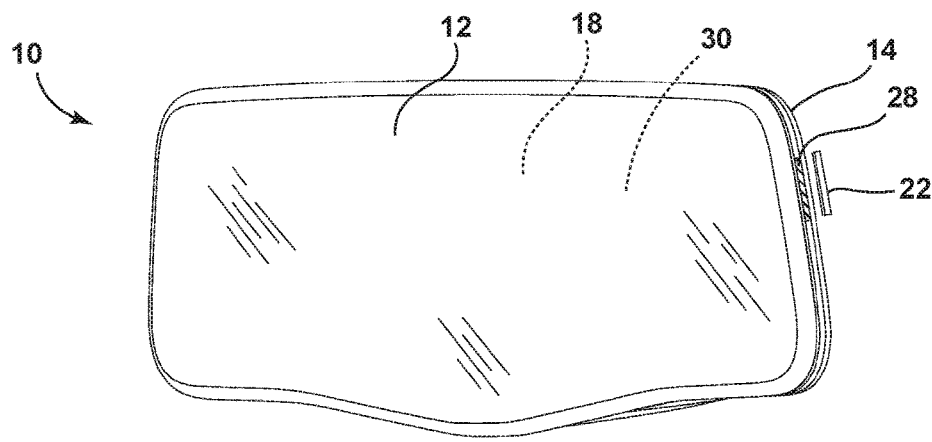
FIG. 1 is a front perspective view of an electro-optic assembly of the present disclosure with a primary seal exploded away from the electro-optic assembly.
Figure 2:
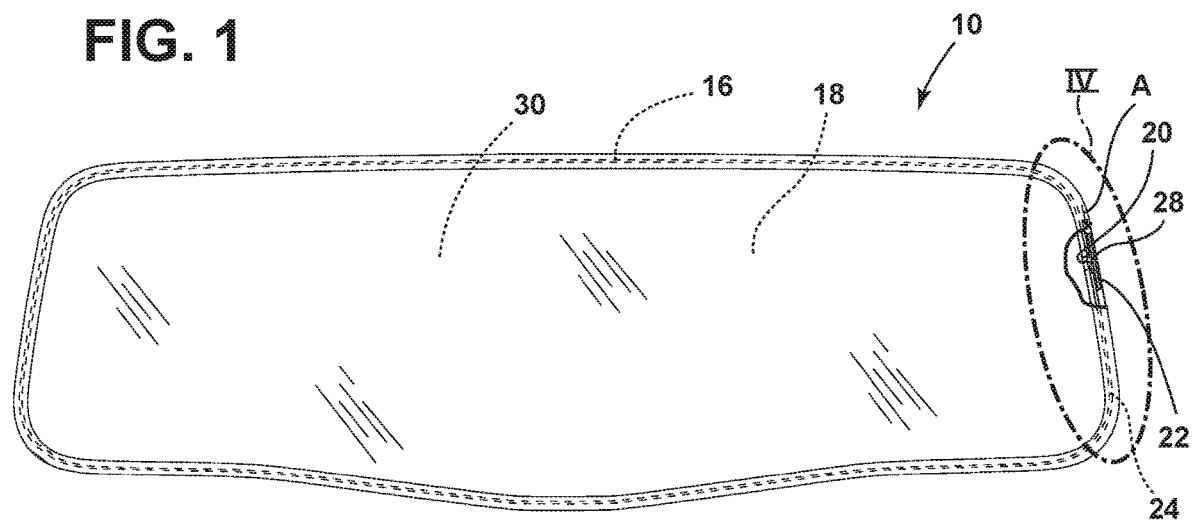
FIG. 2 is a front elevational view of the electro-optic assembly of FIG. 1 of the present disclosure.
Figure 3A:
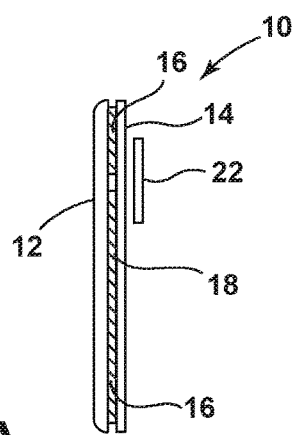
FIG. 3A is a side elevational view of the electro-optic assembly of FIG. 1 before coupling with a secondary seal.
Figure 3B:
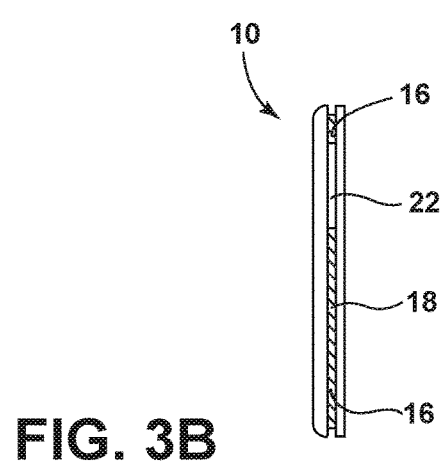
FIG. 3B is a side elevational view of the electro-optic assembly of FIG. 1 after coupling with a secondary seal.

Referring to FIGS. 1-16, the reference numeral 10 generally designates an electro-optic assembly that includes a first substrate 12 and a second substrate 14. A primary seal 16 may be disposed between first substrate 12 and second substrate 14, and may extend about a periphery of each of first and second substrates 12, 14. Primary seal 16, first substrate 12, and second substrate 14 may define an interior cavity 18.

Electro-optic assembly 10 may be generally configured for a variety of uses. Electro-optic assembly 10 may be utilized in small imager devices, heads-up displays, vehicle rearview devices, and the like. Electro-optic assembly 10 may include an electro-optic medium 30 that may be influenced by a voltage applied to electro-optic medium 30, and consequently may darken or lighten. Electro-optic medium 30 may be disposed within interior cavity 18. As previously noted, interior cavity 18 may be generally defined between primary seal 16 and first and second substrates 12, 14.

In some embodiments, as shown in FIGS. 1-4, a fill port 20 may extend through primary seal 16 into interior cavity 18. In some embodiments, fill port 20 may be used to fill interior cavity 18 with electro-optic medium 30. Fill port 20 may subsequently be plugged or otherwise closed by the installation of a sealing plug 28 after electro-optic medium 30 has been inserted into interior cavity 18.

In some embodiments, a secondary seal 22 may be disposed proximate a portion of an exterior sidewall 24 of primary seal 16. In some embodiments, as shown in FIGS. 1-4, secondary seal 22 may be spaced from, but extend generally parallel to, the portion of exterior sidewall 24 of primary seal 16. As a result, a channel 26 may be formed between secondary seal 22 and primary seal 16. After electro-optic medium 30 has been supplied to interior cavity 18, sealing plug 28 may be inserted into channel 26 to seal fill port 20 closed, thereby sealing electro-optic medium 30 inside interior cavity 18. In some embodiments, sealing plug 28 may initially include fluid-like properties, allowing sealing plug 28 to flow into channel 26 before solidifying, becoming a solid plug and thereby sealing interior cavity 18. In some embodiments, sealing plug 28 may be a rigid rivet-like structure.

Figure 4:
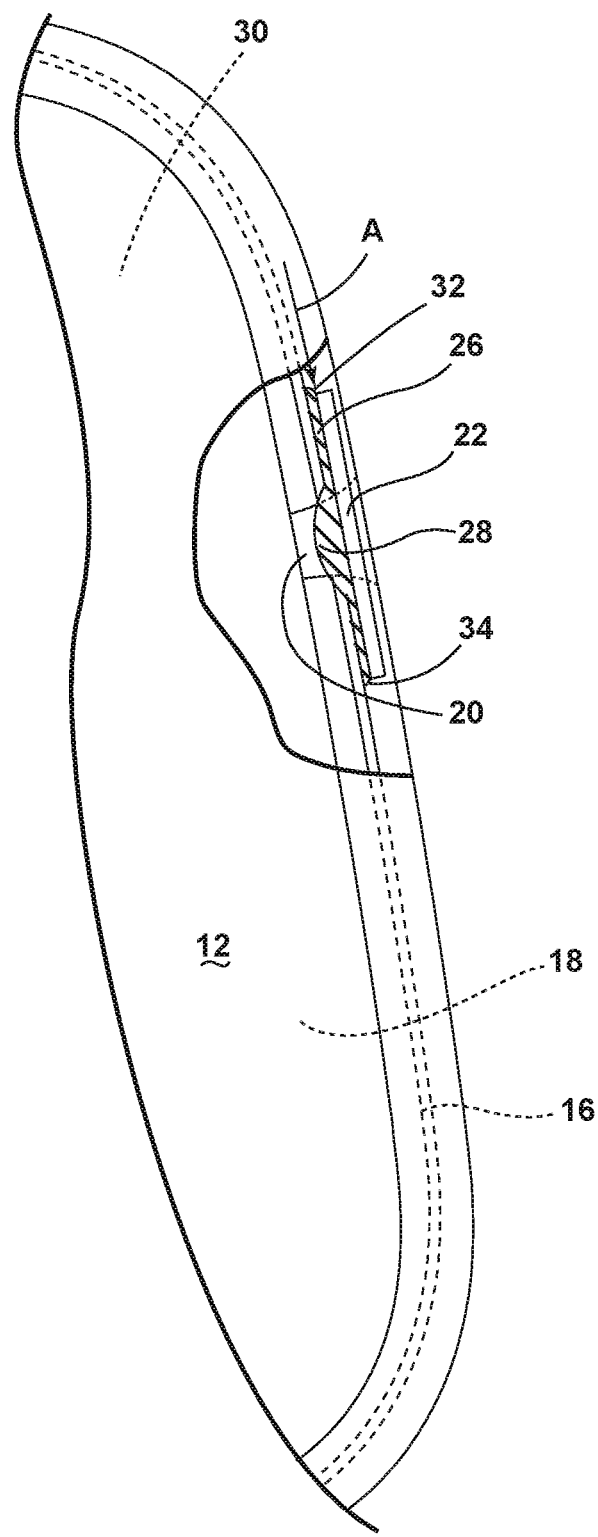
FIG. 4 is an enlarged partial front elevational view of the electro-optic assembly of FIG. 1 taken at area IV.
Figure 5:
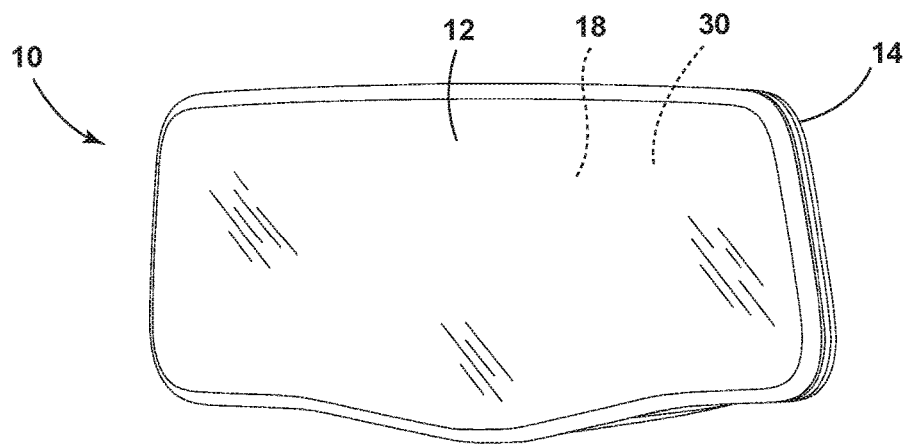
FIG. 5 is a front perspective view of an electro-optic assembly of the present disclosure.
Figure 6:
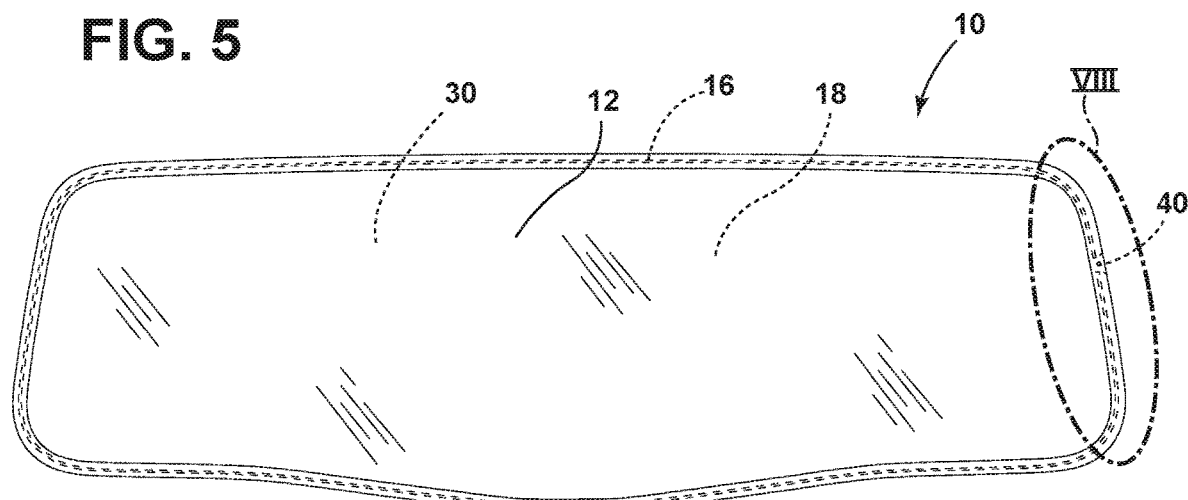
FIG. 6 is a front elevational view of the electro-optic assembly of FIG. 5.
Figure 7A:
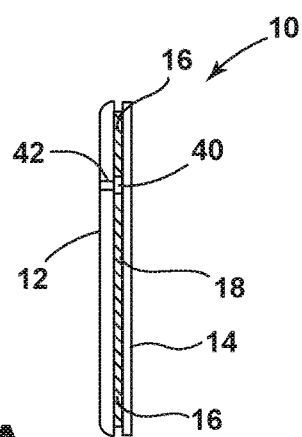
FIG. 7A is a side elevational view of the electro-optic assembly of FIG. 5 prior to installation of a sealing plug.
Figure 7B:
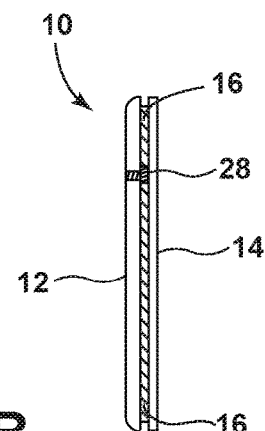
FIG. 7B is a side elevational view of the electro-optic assembly of FIG. 5 after installation of a sealing plug.
Figure 8:
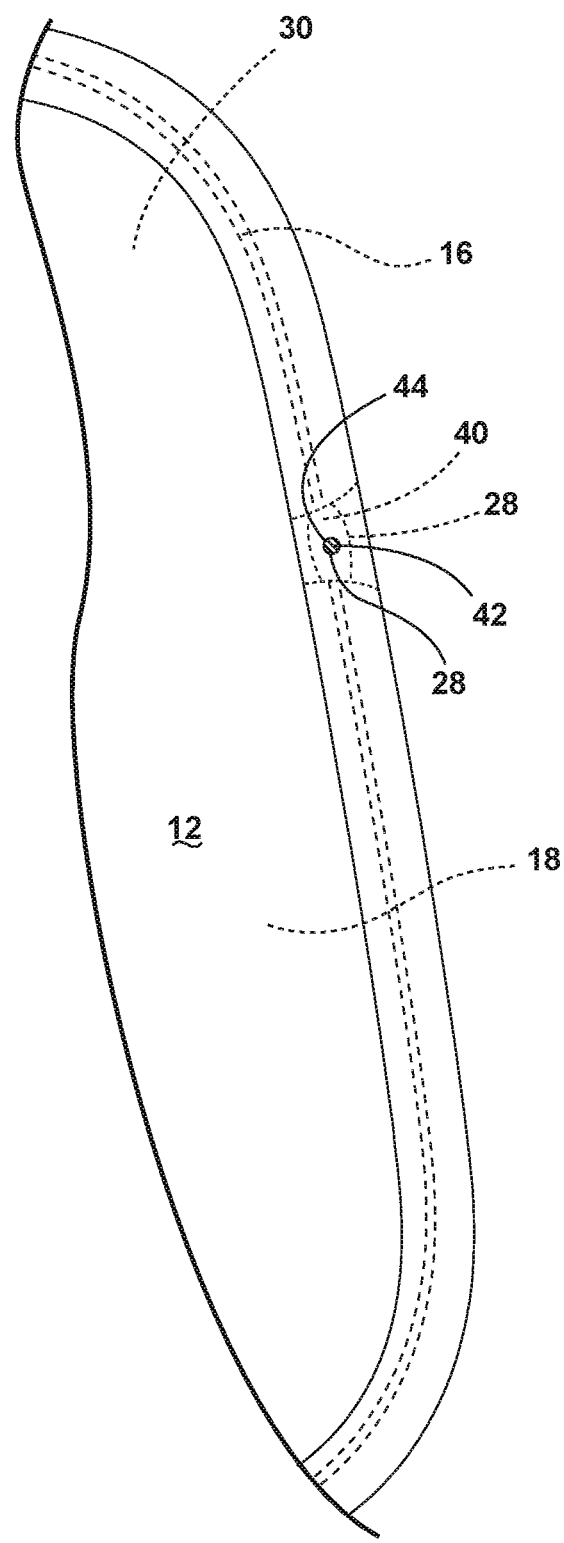
FIG. 8 is an enlarged partial front elevational view of the electro-optic assembly of FIG. 5 taken at area VIII.
Figure 9:
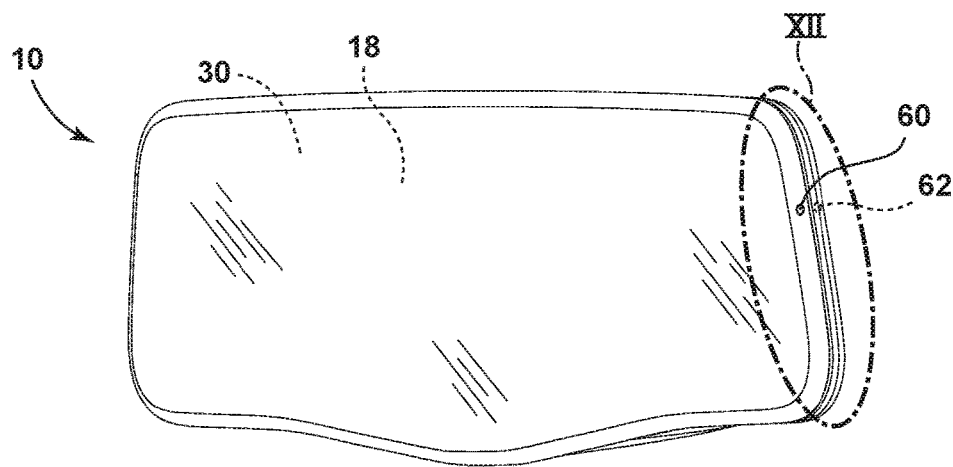
FIG. 9 is a front perspective view of an electro-optic assembly of the present disclosure.
Figure 10:
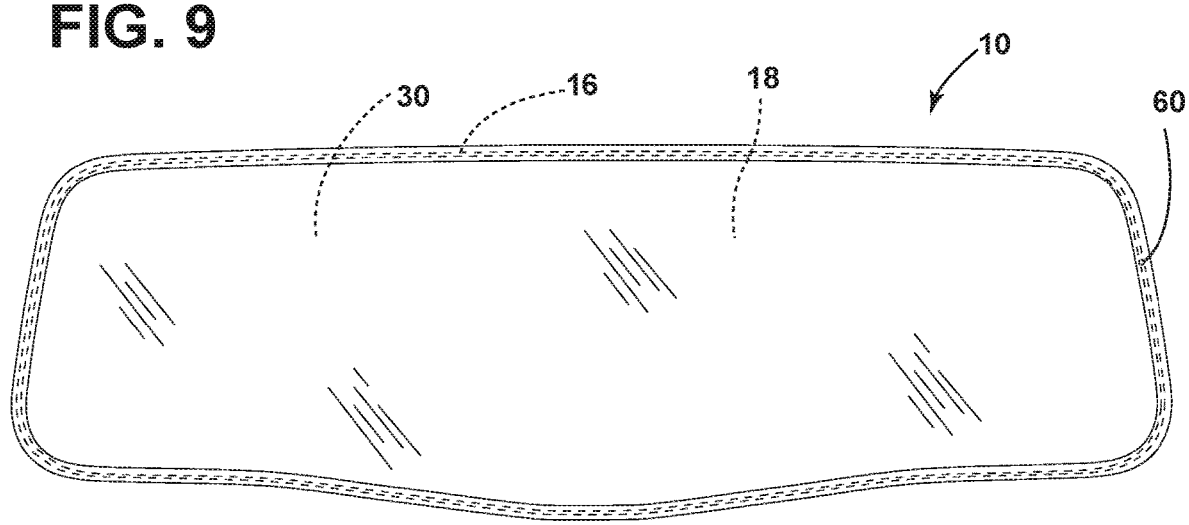
FIG. 10 is a front elevational view of the electro-optic assembly of FIG. 9.
Figure 11A:
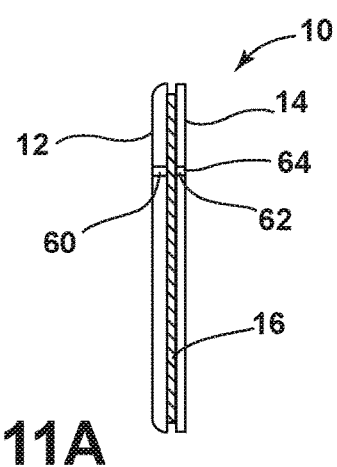
FIG. 11A is a side elevational view of the electro-optic assembly of FIG. 9 before installation of a sealing plug.
Figure 11B:
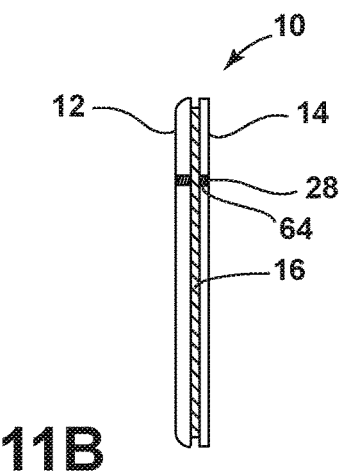
FIG. 11B is a side elevational view of the electro-optic assembly of FIG. 9 after installation of a sealing plug.
Figure 12:
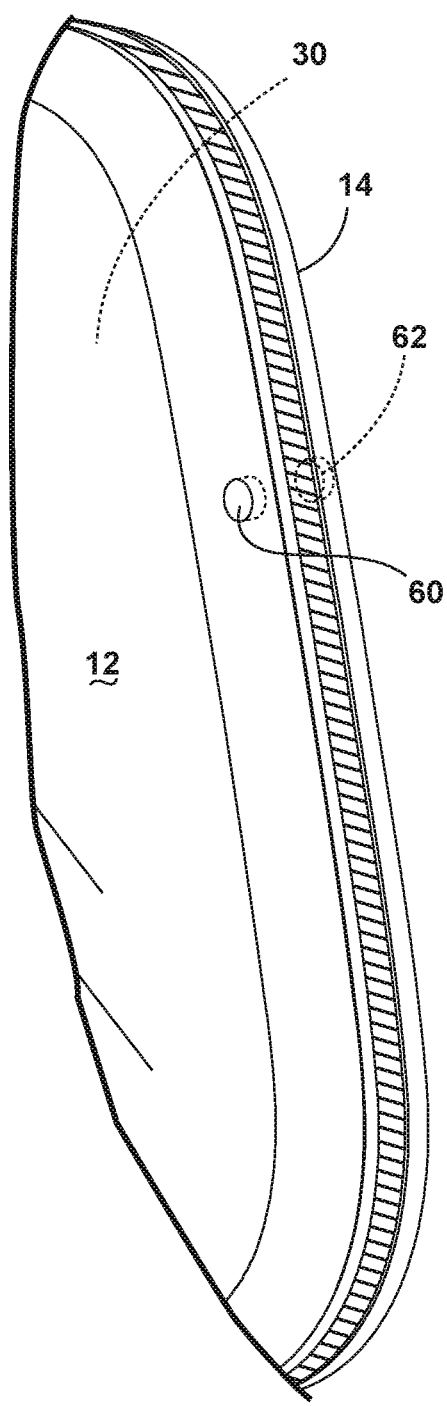
FIG. 12 is a partial front perspective view of the electro-optic assembly of FIG. 9 taken at area XII.
Figure 13:
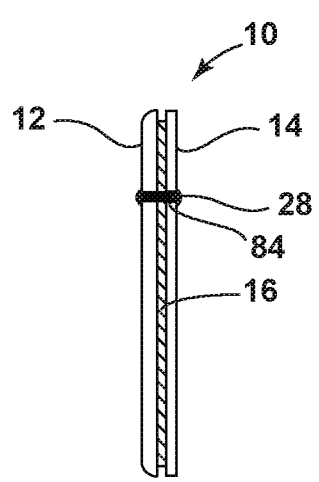
FIG. 13 is a side elevational view of the electro-optic assembly of FIG. 13 after installation of a pass-through sealing plug.
Figure 14:
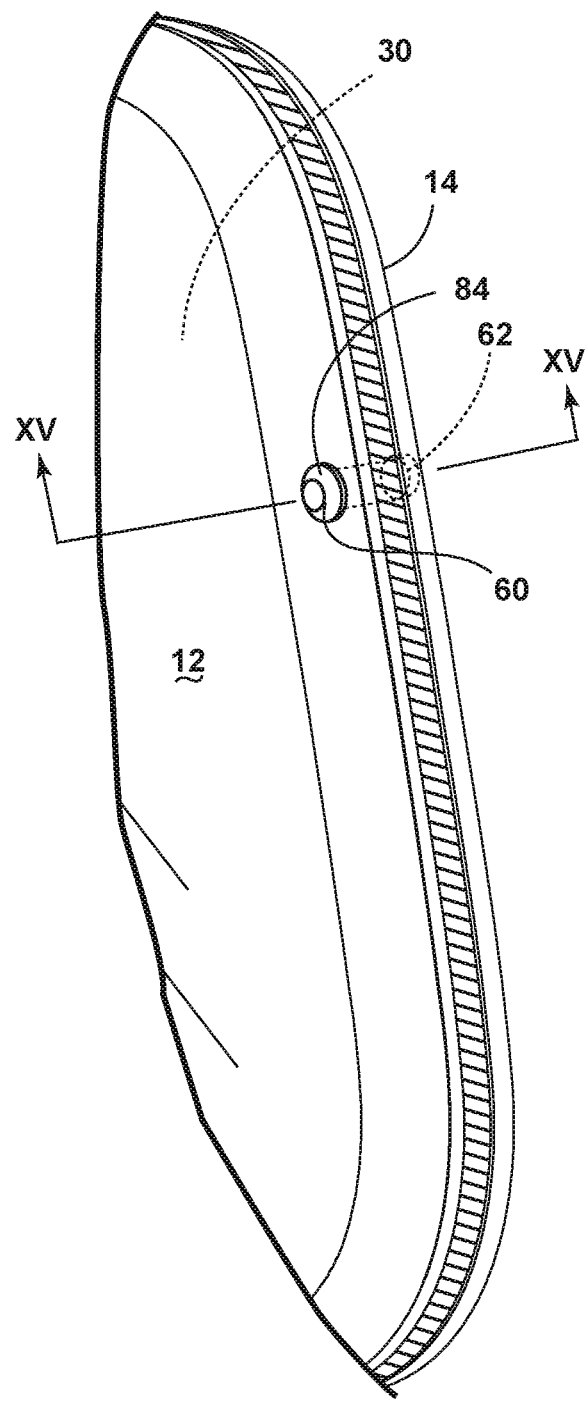
FIG. 14 is a partial front perspective view of another embodiment of an electro-optic assembly of FIG. 9 taken at area XII.

With reference to FIG. 4, in some embodiments, sealing plug 28 may flow into channel 26 in the direction of arrow A. In this instance, a first opening 32 may constitute an inlet for sealing plug 28 and a second opening 34 an outlet. However, sealing plug 28 could also flow into channel 26 through the other side of channel 26 in a direction opposite that of arrow A. In this instance, second opening 34 would constitute an inlet for the sealing plug 28 and first opening 32 would constitute an outlet. In some embodiments, sealing plug 28 may extend at least from first opening 32 to second opening 34. Sealing plug 28 may extend at least partially into fill port 20. Regardless of which opening (first opening 32 or second opening 34) is used as the inlet and which is used as the outlet, the inlet and the outlet may be in close proximity to one another. In some embodiments, the flow of sealing plug 28 could be directed both in the direction of arrow A into first opening 32 and opposite the direction of arrow A into second opening 34. Sealing plug 28 may flow into channel 26, and then may solidify, resulting in a solid plug disposed in channel 26, thereby sealing electro-optic medium 30 into interior cavity 18.

With reference now to FIGS. 5-8, in some embodiments, electro-optic assembly 10 may include a first fill port 40 extending through primary seal 16 between first and second substrates 12, 14. A second fill port 42 may extend through one of first and second substrates 12, 14 and may be in fluid communication with first fill port 40. First and second fill ports 40, 42 may be in fluid communication with interior cavity 18 and together may define a channel 44 through which sealing plug 28 can flow to fill channel 44. As with the previous embodiment, the material of sealing plug 28 may initially include fluid-like properties, such that sealing plug 28 may flow through channel 26 and then solidify, resulting in sealing plug 28 becoming generally solid, thereby sealing interior cavity 18. It will be understood that, in this instance, a longitudinal extent of first and second fill ports 40, 42 generally extend orthogonally to one another. However, in some embodiments, first and second fill ports 40, 42 may extend at a variety of angles relative to one another. It will also be understood that second fill port 42 may be positioned in either of first substrate 12 or second substrate 14. In either instance, first fill port 40 may be in fluid communication with second fill port 42, such that the application of sealing plug 28 into first fill port 40 and from there, into second fill port 42 may result in a sealed interior cavity 18. Alternatively, sealing plug 28 may be inserted into second fill port 42, such that sealing plug 28 flows from second fill port 42 into first fill port 40.

With reference now to FIGS. 9-16, in some embodiments, first substrate 12 may define a first opening 60, and second substrate may define a second opening 62. First opening 60 may be opposite second opening 62. First and second openings 60, 62 may be in fluid communication with interior cavity 18. First and second openings 60, 62 may be disposed near the periphery of first and second substrates 12, 14, and may be in proximity to primary seal 16.

In some embodiments, one end of first and second openings 60, 62 may be disposed to open at least partially into primary seal 16. In some embodiments, one end of first and second openings may be disposed completely in primary seal 16.

In some embodiments, as shown in FIGS. 9-12, first and second openings 60, 62 may define a channel 64, and sealing plug 28 may be disposed in channel 64. As in previous embodiments, sealing plug 28 may initially be a fluid material, allowing sealing plug 28 to flow into channel 64 through one of first and second opening 60, 62. In some embodiments, sealing plug 28 may flow out through the opening opposite the one through which it flowed into channel 64, either second or first opening 62, 60. In some embodiments, sealing plug 28 may be introduced into both first and second openings 60, 62. After flowing through channel 64, sealing plug 28 may solidify, thereby sealing interior cavity 18.

In some embodiments, as shown in FIGS. 13-16, a pass-through seal 84 may be inserted into one of first opening 60 and second opening 62. Pass-through seal 84 may extend from first opening 60 through a portion of interior cavity 18, and through at least a portion of second opening 62. In some embodiments, pass-through seal 84 may comprise a shank portion 89 having a first end 88 having a head portion 86, and a second end 90. In some embodiments, head portion 86 of pass-through seal 84 may be one of disk-shaped and annular, although other shapes and configurations are possible. Head portion 86 of pass-through seal 84 may have a cross-section, and first and second openings 60, 62 may each have cross-sections. In some embodiments, the cross-section of head portion 86 of pass-through seal 84 may be larger than at least one of the cross-sections of first and second openings 60, 62. In some embodiments, head portion 86 of pass-through seal 84 may be configured to be large enough to prevent head portion from entering either first or second opening 60, 62. Pass-through seal 84 may be configured to allow head portion 86 to rest generally flush against an exterior surface of one of first substrate 12 and second substrate 14 surrounding first or second opening 60, 62 respectively when shank portion 89 of pass-through seal 84 is inserted into one of first and second opening 60, 62. In some embodiments, first and second openings may be generally cylindrical, and shank portion 89 of pass-through seal 84 may extend coaxially through first and second openings 60, 62.

Figure 15:
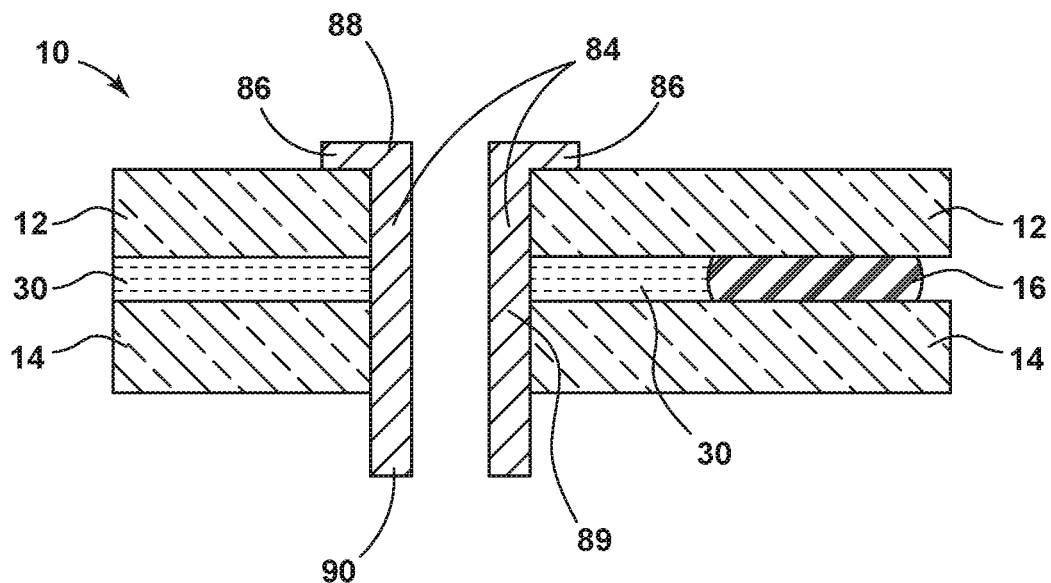
FIG. 15 is a side view of an embodiment of a pass-through seal inserted into the electro-optic assembly of FIG. 13, taken along line XV-XV of FIG. 14.
Figure 16:
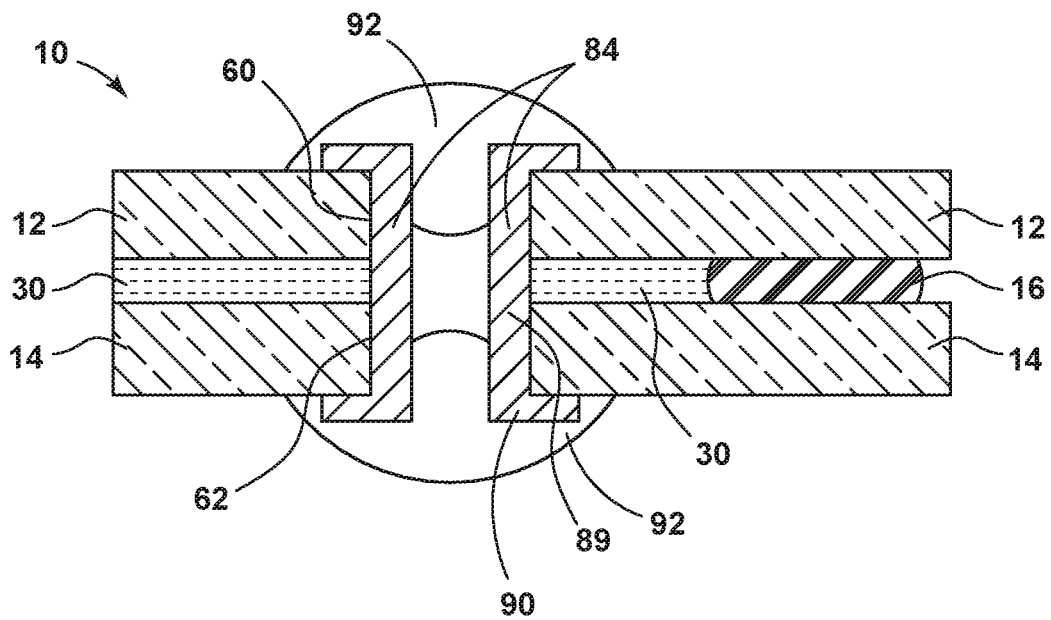
FIG. 16 is a side view of an embodiment of the pass-through seal installed in the electro-optic assembly of FIG. 13, taken along line XV-XV of FIG. 14.

In some embodiments, pass-through seal 84 may comprise a rivet or a rivet-like structure as shown in FIGS. 15 and 16. Pass-through seal 84 may be inserted into one of first and second openings 60, 62 until head portion 86 abuts the exterior surface of first or second substrate 12, 14 surrounding first or second opening 60, 62 through which pass-through seal 84 was inserted, as shown in FIG. 15. In some embodiments, once pass-through seal 84 has been inserted into electro-optic device, second end 90 of pass-through seal 84 may extend from the first or second opening 60, 62 opposite the opening through which pass-through seal 84 was inserted. Pass-through seal 84 may be configured to, upon longitudinal compression of pass-through seal 84, allow a flattening and widening of second end 90, thereby causing second end 90 to rest generally flush against an exterior surface of first or second substrate 12, 14. The flattening and widening of second end 90 may serve to seal interior cavity 18, as shown in FIG. 16.

In some embodiments, pass-through seal 84 may comprise a cylinder, a cylindrical cone, a bar-bell, or any other shape that may extend through and seal first and second openings 60, 62. Pass-through seal 84 may be configured to be press-fit into at least one of first and second openings 60, 62.

In some embodiments, pass-through seal 84 may be of a plastic or other material that may be partially deformable in at least some conditions. In some embodiments, pass-through seal 84 may be partially deformable in some conditions, while it will hold its shape without deforming in other conditions. Pass-through seal 84 may be of a material sufficiently deformable to allow it to be compressed and pushed into and through first and second openings 60, 62. Once inserted into one of first and second openings 60, 62, pass-through seal 84 may resume its original shape, thereby sealing interior cavity 18. In some embodiments, pass-through seal 84 may be deformable in certain temperatures or for a certain time period, and may then solidify, resulting in a solid plug. In some embodiments, pass-through seal 84 may be of a material that may be initially deformable, and may be cured once it is correctly positioned, such as an epoxy.

In some embodiments, pass-through seal 84 may comprise a metal. Pass-through seal 84 may comprise a deformable metal. In some embodiments, pass-through seal 84 may comprise a metal that does not react with electro-optic medium 30, such as silver or gold. In some embodiments, pass-through seal 84 may be of a metal that may react with electro-optic medium 30, and may be coated with a metal that does not react with electro-optic medium 30, such as silver-plated copper. Using a coated metal may allow the use of a less-expensive metal for pass-through seal 84, thus minimizing the use of more expensive metals and still preventing unwanted interactions between electro-optic medium 30 and the material of pass-through seal 84.

In some embodiments, a second sealing material 92 may be disposed to cover exposed portions of pass-through seal 84 as shown in FIG. 16. In some embodiments, second sealing material 92 may be disposed to encase head portion 86 of pass-through seal 84. In some embodiments, second sealing material 92 may encase both head portion 86 and second end 90 of pass-through seal 84. In some embodiments, second sealing material 92 may encase all exposed portions of pass-through seal 84. Second sealing material 92 may be an initially flexible or fluid-like material. In some embodiments, second sealing material 92 may solidify after being placed in the desired position. In some embodiments, second sealing material may be placed in the desired position then cured to form a solid seal.

Second sealing material 92 may comprise any material that is capable of sealing the perimeter of pass-through seal 84 and at least one of first and second substrates 12, 14, to prevent electro-optic medium 30 from leaking from interior cavity 18. Second sealing material 92 may comprise, for example, a UV-curable or thermal-curable epoxy or epoxy resin, acrylate or acrylate resin, polyisobutylene. Second sealing material 92 may comprise mixtures of liquid epoxy resin with liquid polyamide resin or dicyandiamide.

It will also be understood that components of each electro-optic assembly 10 may be aligned during manufacturing so that one continuous channel may be provided through several electro-optic assemblies 10 at the same time. Consequently, sealing plug 28 can flow through several adjacent electro-optic assemblies 10 simultaneously. It will be understood that for each embodiment disclosed above, a portion of sealing plug 28 may swell into interior cavity 18. However, the swelling may result in even a better seal in certain applications. It will also be understood that for each of the embodiments disclosed herein, like reference numerals generally designate like or similar features for each embodiment.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The present illustrated embodiments reside primarily in combinations of method steps and apparatus components of the pass-through plug for an electro-optic assembly. The apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An electro-optic assembly comprising:
   a first substrate;
   a second substrate opposite the first substrate;
   a seal disposed between the first substrate and the second substrate, wherein the seal, the first substrate, and the second substrate define an interior cavity;
   a first opening, having a first cross-section, defined by the first substrate;
   a second opening, having a second cross-section, defined by the second substrate, wherein the first opening and the second opening are in fluid communication with the interior cavity.

2. The electro-optic assembly of claim 1, further comprising a plug disposed within and extending between the first and second openings.

3. The electro-optic assembly of claim 2, wherein the plug comprises a sealing plug material; wherein the sealing plug material comprises an initially fluid material.

4. The electro-optic assembly of claim 3, wherein the sealing plug material is capable of hardening to form a solid plug.

5. The electro-optic assembly of claim 3, further comprising a sealing material;
wherein the sealing material is disposed to cover exposed portions of the plug.

6. The electro-optic assembly of claim 2, wherein the plug comprises a pass-through plug; and wherein the plug extends through first and second openings and a portion of the interior cavity.

7. The electro-optic assembly of claim 6, wherein the plug comprises a first and a second end, and a shank extending therebetween; and
wherein the first end comprises a head, the head configured to have a larger cross-section than at least one of the first and second cross-sections of the first and the second openings.

8. The electro-optic assembly of claim 6, wherein the plug comprises a rivet.

9. The electro-optic assembly of claim 6, further comprising a sealing material;
wherein the sealing material is disposed to cover exposed portions of the head and the second end of the plug.

10. The electro-optic assembly of claim 9, wherein the sealing material is initially deformable.

11. The electro-optic assembly of claim 7, wherein the second end of the plug is deformable.

12. An electro-optic assembly comprising:
a first substrate;
a second substrate opposite the first substrate;
a seal disposed between the first substrate and the second substrate, wherein the seal, the first substrate, and the second substrate define an interior cavity;
a first opening extending through the seal between the first substrate and the second substrate;
a second opening extending through one of the first and the second substrates, wherein the first opening and the second opening are in fluid communication with the interior cavity and together define a channel; and
a plug disposed within the channel.

13. The electro-optic assembly of claim 12, wherein the plug is an initially fluid material.

14. The electro-optic assembly of claim 12, wherein one end of the first opening is disposed at least partially in the seal; and
wherein one end of the second opening is disposed at least partially in the seal.

15. The electro-optic assembly of claim 12, wherein one end of the first opening is disposed within the seal; and
wherein one end of the second opening is disposed within the seal.

16. The electro-optic assembly of claim 12, wherein the first opening is opposite the second opening.

* * * * *